United States Patent [19]
Castelli et al.

[11] Patent Number: 5,748,221
[45] Date of Patent: May 5, 1998

[54] APPARATUS FOR COLORIMETRY GLOSS AND REGISTRATION FEEDBACK IN A COLOR PRINTING MACHINE

[75] Inventors: Vittorio Castelli; Edward J. Solcz, both of Yorktown Heights; John J. Ricciardelli, Poughkeepsie, all of N.Y.; Harold Anderson, Rancho Palos Verdes, Calif.; Harold Brown, New City, N.Y.

[73] Assignee: Xerox Corporation, Stamford, Conn.

[21] Appl. No.: 551,306

[22] Filed: Nov. 1, 1995

[51] Int. Cl.⁶ .................................................. B41J 2/47
[52] U.S. Cl. ............................................. 347/232; 358/518
[58] Field of Search ........................... 347/232; 358/501, 358/518, 523, 525; 399/101, 107, 109

[56] References Cited

U.S. PATENT DOCUMENTS

| | | | |
|---|---|---|---|
| 4,804,979 | 2/1989 | Kamas et al. | 346/157 |
| 4,916,547 | 4/1990 | Katsumata et al. | 358/300 |
| 4,965,597 | 10/1990 | Ohigashi et al. | 346/157 |
| 5,160,946 | 11/1992 | Hwang | 346/157 |
| 5,162,860 | 11/1992 | Nami et al. | 358/501 |
| 5,377,000 | 12/1994 | Berends | 356/73 |

*Primary Examiner*—Mark J. Reinhart
*Attorney, Agent, or Firm*—Kevin R. Kepner

[57] ABSTRACT

A method and apparatus for measuring colorimetric, gloss and registration data on a substrate exiting a printing machine. A detector using a series of red, green, and blue filters collects image data and maps the collected data to absolute color coordinates. The apparatus is factory calibrated to the specific colorants used in the printing machine. Gloss measurements are made using the same apparatus. Registration data between the various color separations is also obtained and feedback delivered to the various imaging modules. The detector allows on the fly data to be obtained and machine specific corrections to be made.

13 Claims, 5 Drawing Sheets

APPARATUS FOR COLORIMETRY GLOSS AND REGISTRATION FEEDBACK IN A COLOR PRINTING MACHINE

This invention relates generally to the calibration, registration and gloss control of color images in a color image output terminal (IOT), and more particularly concerns an improved color image alignment and image quality control system utilizing an improved multifunction sensing and feedback device in full color printing machines including electrophotographic, ink jet, thermal transfer, sublimation and other types. Of these the electrophotographic type will be most used as example in the following diclosure; however, any of the others would have been suitable.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

The foregoing generally describes a typical black and white electrophotographic printing machine. With the advent of multicolor electrophotography, it is desirable to use an architecture which comprises a plurality of image forming stations. One example of the plural image forming station architecture utilizes an image on image system in which the photoreceptive member is recharged, reimaged and developed for each color separation. This charging, imaging, developing and recharging reimaging and developing is done in a single revolution of the photoreceptor in so-called single pass machines, while multipass architectures form each color separation with a single charge, recharge system and imager and multiple developers, one for each color. The single pass architecture offers a potential for high throughput.

In order to deliver good quality images, strict specifications are imposed on the accuracy with which the color image output terminal superimposes the various color separations which compose the individual images. This juxtaposition accuracy is often called registration. In the trade, a limit of 125 micrometers is considered a maximum for acceptable misregistration errors of quality pictorial color images and a 75 micrometer limit is often imposed as a limit by the manufacturers of top quality equipment. Some imaging techniques require registration accuracy of 15 micrometers for pictorial information. An accuracy of 35 micrometers is typically required for the printing of fine colored text. These numbers represent the diameter of a circle which would encompass all supposedly homologous color dots.

Additionally it is important to be able to accurately reproduce colors and print these colors at a desired gloss level. A single device which can determine colorimetric, gloss and registration values from test images is highly desireable in multicolor document output terminals.

One common way of improving registration is described in U.S. Pat. No. 4,903,067 to Murayama et al. Murayama et al. employ a marking system with a detector for measuring alignment errors and mechanically move individual color printers to correct misalignment. Color printers that employ marks produced by each of the constituent colors in juxtaposition with each other enable correction of lateral and longitudinal relative position, skew and magnification.

Measurement of the position of each of the registration marks and the test patches for gloss and colorimetric values may be accomplished by illuminating the marks and employing a lens to collect the diffusely reflected light to image the reflection on photodetectors or photodetector arrays. The illumination is in the visible wavelength. In order to reliably detect the position of the registration mark and the test patches, the diffuse reflection from the marks must be significantly different from its background. It is desirable therefore, The following disclosures may be relevant to various aspects of the present invention:

U.S. Pat. No. 5,160,946

Inventor: Hwang

Issue Date: Nov. 3, 1992

U.S. Pat. No. 4,965,597

Patentee: Ohigashi et al.

Issued: Oct. 23, 1990

U.S. Pat. No. 4,916,547

Patentee: Katsumata et al.

Issued: Apr. 10, 1990

U.S. Pat. No. 4,804,979

Patentee: Kamas et al.

Issued: Feb. 14, 1989

The relevant portions of the foregoing disclosures may be briefly summarized as follows:

U.S. Pat. No. 5,160,946 to Hwang discloses a registration system for an electrophotographic printing machine which forms registration indicia at a first transfer station and utilizes the formed indicia to register the image at subsequent transfer stations.

U.S. Pat. No. 4,965,597 discloses a color image recording apparatus which superimposes a plurality of different color images on one another to form a composite image. Registration marks are formed on a recording medium and are sensed at each station to assure a clear and accurate superimposed image. A sensor senses one or both edges of a recording medium to note image deviations caused by transport to enable compensation thereof.

U.S. Pat. No. 4,916,547 discloses a color image forming apparatus which produces a single composite color image on a paper. The paper is transported by a belt and the composite color image is formed by transferring image components of different colors to the paper in register with each other. The apparatus reduces positional deviation of a plurality of image components of different colors by sensing signals on a surface of the transfer belt outside a paper region. The sensor senses arriving pattern images and corrects for unaligned images by calculating a deviation amount and adjusting a timing signal accordingly.

U.S. Pat. No. 4,804,979 discloses a single pass color printer/plotter having four separate microprocessor-based print stations, each for printing a different color image for superimposition with one another to form a full color image. The printer includes a registration system where each print station monitors registration marks to correct for media variations. Each print station includes optical sensors that monitor the marks printed on the media edge to synchronize the printing and align the images properly.

Commercial spectrophotometers and colorimeters such as the Minolta® CM-2002 spectrophotometer and an X-Rite® DTP51 Colorimeter are available to perform various colorimetric and gloss tests, however these devices are slow and require significant set-up time.

In accordance with one aspect of the present invention, there is provided a high speed multi-function sensor for a multi-color printing machine. The apparatus comprises a first detector for determining a colorimetric value of an image and generating a signal indicative thereof, a second detector for determining a gloss value of an image and generating a signal indicative thereof and a third detector for determining a registration value between a plurality of color separations in the image and generating a signal indicative thereof. The fourth detector is a timing (or windowing) mark detector to initiate the above-indicated measurements.

Pursuant to another aspect of the present invention, there is provided a color electrophotographic printing machine. The machine comprises a full color electrophotographic printing machine having an intregral device for determining colorimetric, gloss, and registration values for an image. The device comprises a first detector for determining a colorimetric value of an image and generating a signal indicative thereof, a second detector for determining a gloss value of an image and generating a signal indicative thereof and a third detector for determining a registration value between a plurality of color separations in the image and generating a signal indicative thereof. A fourth detector is a timing (or windowing) mark detector to initiate the above-indicated measurements.

Pursuant to yet another aspect of the present invention, there is provided a method for determining colorimetric, gloss, and registration mark values in a full color electrophotographic printing machine. The method comprises illuminating a test pattern with a light source, detecting the reflected signal from the target pattern, filtering the detected signal with a red, green, and blue filter respectively and converting the filtered signals to a colorimetric (L* a* b*) value for the specific colorant in the printing machine. Said conversion depends on dedicated calibration procedures.

Other features of the present invention will become apparent as the following description proceeds and upon reference to the drawings, in which.

This invention relates to an imaging system which is used to produce color output in a single revolution or pass of a photoreceptor belt. It will be understood, however, that it is not intended to limit the invention to the embodiment disclosed. On the contrary, it is intended to cover all alternatives, modifications and equivalents as may be included within the spirit and scope of the invention as defined by the appended claims, including a multiple pass color process system, and a single or multiple pass highlight color system.

Figure 6:
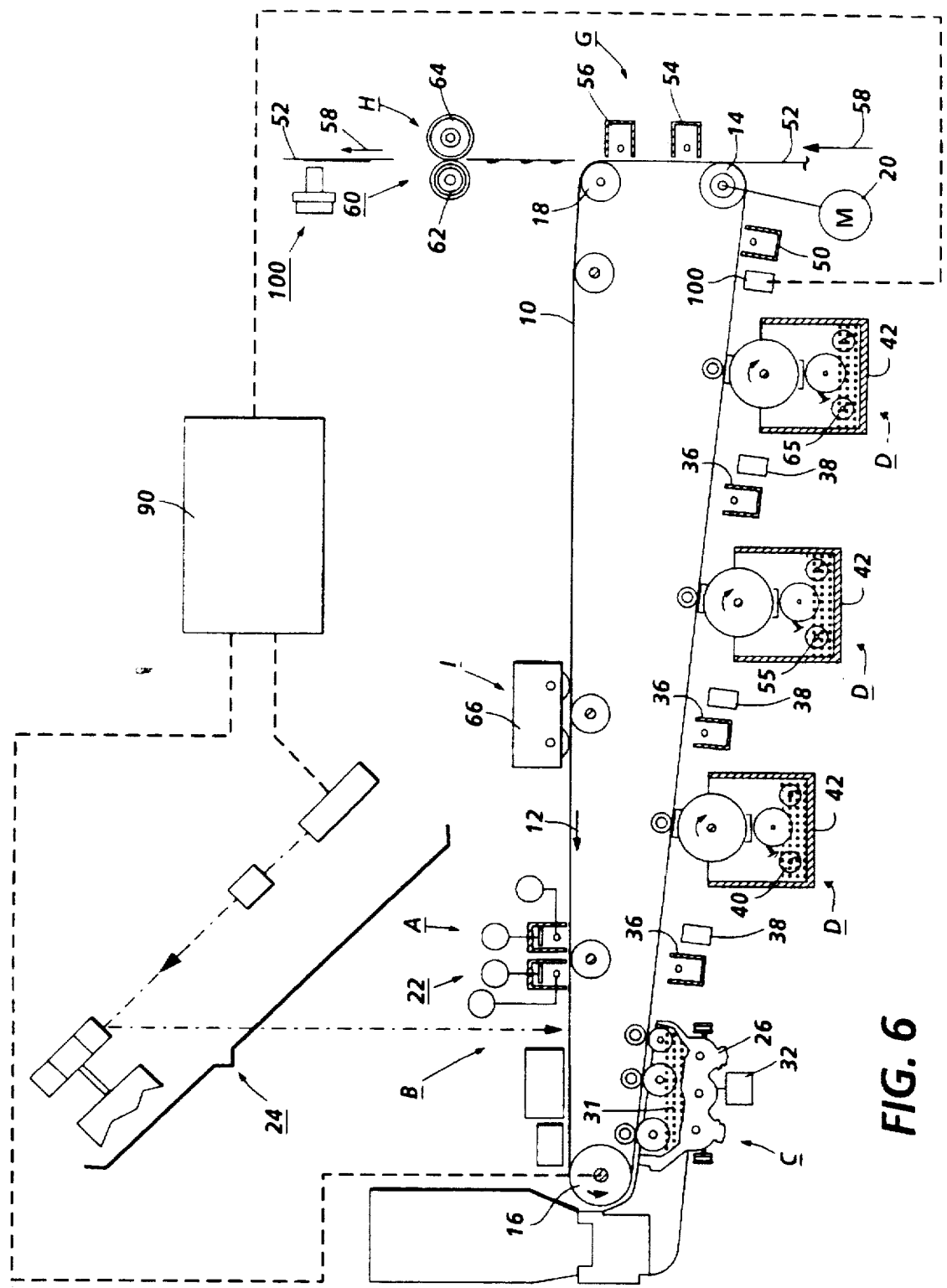
FIG. 6 is a schematic diagram of a four color image output terminal utilizing the device of the present invention.

Turning now to FIG. 6, the printing machine of the present invention uses a charge retentive surface in the form of an Active Matrix (AMAT) photoreceptor belt 10 supported for movement in the direction indicated by arrow 12, for advancing sequentially through the various xerographic process stations. The belt is entrained about a drive roller 14, tension rollers 16 and fixed roller 18 and the roller 14 is operatively connected to a drive motor 20 for effecting movement of the belt through the xerographic stations.

With continued reference to FIG. 6, a portion of belt 10 passes through charging station A where a corona generating device, indicated generally by the reference numeral 22, charges the photoconductive surface of belt 10 to a relative high, substantially uniform, preferably negative potential.

Next, the charged portion of photoconductive surface is advanced through an imaging station B. At exposure station B, the uniformly charged belt 10 is exposed to a laser based output scanning device 24 which causes the charge retentive surface to be discharged in accordance with the output from the scanning device. Preferably the scanning device is a laser Raster Output Scanner (ROS). Alternatively, the ROS could be replaced by other xerographic exposure devices such as LED arrays.

The photoreceptor, which is initially charged to a voltage $V_0$, undergoes dark decay to a level $V_{ddp}$ equal to about −500 volts. When exposed at the exposure station B it is discharged to $V_{background}$ equal to about −50 volts. Thus after exposure, the photoreceptor contains a monopolar voltage profile of high and low voltages, the former corresponding to charged areas and the latter corresponding to discharged or background areas.

At a first development station C, a magnetic brush developer structure, indicated generally by the reference numeral 26 advances insulative magnetic brush (IMB) material 31 into contact with the electrostatic latent image. The development structure 26 comprises a plurality of magnetic brush roller members. These magnetic brush rollers present, for example, charged black toner material to the image areas for development thereof. Appropriate developer biasing is accomplished via power supply 32.

A corona recharge device 36 having a high output current vs. control surface voltage (I/V) characteristic slope is employed for raising the voltage level of both the toned and untoned areas on the photoreceptor to a substantially uniform level. The recharging device 36 serves to recharge the photoreceptor to a predetermined level.

A second exposure or imaging device 38 which may comprise a laser based input and/or output structure is utilized for selectively discharging the photoreceptor on toned areas and/or bare areas, pursuant to the image to be developed with the second color developer. At this point, the photoreceptor contains toned and untoned areas at relatively high voltage levels and toned and untoned areas at relatively low voltage, levels. These low voltage areas represent image areas which are developed using discharged area development (DAD). To this end, a negatively charged, developer material 40 comprising color toner is employed. The toner, which by way of example may be yellow, is contained in a developer housing structure 42 disposed at a second developer station D and is presented to the latent images on the photoreceptor by a of a magnetic brush developer roller. A power supply (not shown) serves to electrically bias the developer structure to a level effective to develop the DAD image areas with negatively charged yellow toner particles 40.

The above procedure is repeated for a third imager for a third suitable color toner such as magenta and for a fourth imager and suitable color toner such as cyan. In this manner a full color composite toner image is developed on the photoreceptor belt.

To the extent to which some toner charge is totally neutralized, or the polarity reversed, thereby causing the composite image developed on the photoreceptor to consist of both positive and negative toner, a negative pre-transfer dicorotron member 50 is provided to condition the toner for effective transfer to a substrate using positive corona discharge.

Subsequent to image development a sheet of support material 52 is moved into contact with the toner images at transfer station G. The sheet of support material is advanced to transfer station G by conventional sheet feeding apparatus, not shown. Preferably, the sheet feeding apparatus includes a feed roll contacting the uppermost sheet of a stack copy sheets. The feed rolls rotate so as to advance the uppermost sheet from stack into a chute which directs the advancing sheet of support material into contact with photoconductive surface of belt 10 in a timed sequence so that the toner powder image developed thereon contacts the advancing sheet of support material at transfer station G.

Transfer station G includes a transfer dicorotron 54 which sprays positive ions onto the backside of sheet 52. This attracts the negatively charged toner powder images from the belt 10 to sheet 52. A detack dicorotron 56 is provided for facilitating stripping of the sheets from the belt 10.

After transfer, the sheet continues to move, in the direction of arrow 58, onto a conveyor (not shown) which advances the sheet to fusing station H. Fusing station H includes a fuser assembly, indicated generally by the reference numeral 60, which permanently affixes the transferred powder image to sheet 52. Preferably, fuser assembly 60 comprises a heated fuser roller 62 and a backup or pressure roller 64. Sheet 52 passes between fuser roller 62 and backup roller 64 with the toner powder image contacting fuser roller 62. In this manner, the toner powder images are permanently affixed to sheet 52 after it is allowed to cool. After fusing, a chute, not shown, guides the advancing sheets 52 to a catch tray, not shown, for subsequent removal from the printing machine by the operator. The sensor device 100 of the present invention is located in the paper path between the fuser assembly 60 and the catch tray. The fused target substrate 52 is passed by the sensor and a sample image is scanned for calibration purposes as described below.

After the sheet of support material is separated from photoconductive surface of belt 10, the residual toner particles carried by the non-image areas on the photoconductive surface are removed therefrom. These particles are removed at cleaning station H using a cleaning brush structure contained in a housing 66.

It is believed that the foregoing description is sufficient for the purposes of the present application to illustrate the general operation of a color printing machine.

Turning now to FIGS. 1-5 inclusive, for clarity and convenience, the schemes will be described in terms of chevron marks and bicell detectors such as those described in U.S. Pat. No. 5,287,162, the pertinent portions of which are herein incorporated by reference.

The main feature of the sensor device is the color measurement. The color-to-color registration enables the sensor to be used either in place of a MOB (Mark-on-Belt) sensor, or whenever the toners are indistinguishable from each other in infrared lighting (the MOB illumination source). The gloss measurement is an additional feature which helps control another important quality characteristic of the printer output.

The conceptual basis of the design is to measure color by imaging a part of an illuminated color patch on three amorphous silicon detector elements after filtering with red, green, and blue materials. The technology is akin to that of color input scanners. The detector outputs can be used as densitometric values to assure color constancy. Calibration of the resulting instrument outputs against measurement by laboratory colorimeters taken over a large sample of patches made by the toners of the printer of interest allows mapping to absolute color coordinates (such as $L^*a^*b^*$). A mobile dust cover 170 (FIG. 5) is used to prevent excessive contamination and doubles in its function in presenting a white sample to the device for drift correction purposes.

Color-to-color registration errors are measured by the same chevron mark technology successfully employed in MOB sensors. The only difference is that the operation is performed in the visible range and the same illumination, optics and detector chip as in the color measurement are used. Bi-cell detectors 140,142, 144, 146 (FIG. 1) on the chip perform this function. To improve measurement contrast red, green and blue filters are also used on these bi-cells. The red-filtered photodiodes are used to measure the relative positions of the cyan and black registration marks; while the green-filtered photodiodes are used to measure the relative positions of the magenta and black registration marks; and the blue-filtered photodiodes are used to measure the relative positions of the yellow and black registration marks. The rows of bicell photodiodes, groups 160, are arranged to align with the optical center in order to eliminate any deleterious effects of barreling or pin-cushioning. The auxiliary blue-filtered bicell photodiodes, group 140, are not so aligned, and as a result, the image of straight registration marks may be subject to curvature. So long as this effect is understood, the auxiliary blue-filtered bicells 140 can be advantageously used for extending the lateral capture range in coarse registration procedures and for obtaining larger signals from yellow marks.

Gloss is measured at a 45 degree specular angle by means of a green-filtered amorphous silicon detector 107. In the present configuration no optical elements are included so that some diffuse reflection may add to the signal. However, this error should be tolerable.

The reflectance values measured by the sensor elements are mapped to corresponding laboratory spectrophotometer CIELAB values (e.g., for D50/2 deg) by use of neural networks. Specifically, the factory calibration proceeds as follows. A number of color patches are printed using the toners from the target printer family using a printer representative of that family. The color of the patches are selected so as to adequately represent the volume and surface of the printer's color gamut. The CIELAB coordinates of the patches need to be measured once using the spectrophotometer and the data stored. These same patches are then measured by means of the sensor of this invention. The data set from the sensor, together with the corresponding spectrophotometer results, is then used to create a mapping between the sensor's rgb space to the CIELAB color space. The fidelity of the mapping on several test patches is verified and evaluated for the specific toners used in the printer. Once a valid network is built for a specific set of toners, it can be exercised with any test patch printed using those toners to produce absolute measurements (L*a*b*). The parameters representing the mapping are then stored in permanent memory onboard the sensor for field use. Depending upon manufacturing tolerances and desired color accuracies, this factory calibration procedure can be followed for each sensor. Alternatively, this procedure can be followed using data from sensors selected according to quality control audits of a batch build. The parameters obtained from factory calibration of the selected sensors could then be stored permanently onboard the remaining sensors in the batch (as well as those that were tested). The neural network is the most general and can be implemented with data which are not organized in a rectangular grid. On the other hand, these networks are computationally intensive not only during their learning phase but also in their application phase. Therefore, a possible course of action is to use the learned neural network to generate data with inputs on a rectangular mesh so that mapping in real use can be performed by straight forward linear interpolation. Under these conditions, the rectangular mesh would also be created once during factory calibration.

Amorphous silicon was chosen because of its low cost for the rather large detector area (9×9 mm), because of its low dark reverse current and because of its insensitivity to infrared radiation. Crystalline silicon could also be used with the appropriate filtering. (Note that amorphous silicon also needs a detector trimming filter to eliminate unwanted effects of infrared sensitivity). The sensor 100 location is downstream of the fuser as shown in FIG. 6.

The subject invention can be produced at a very low cost and it can compete with much more expensive instruments because it is calibrated against the specific toners with which it is going to be used in a printer and can be mass produced.

Figure 7:
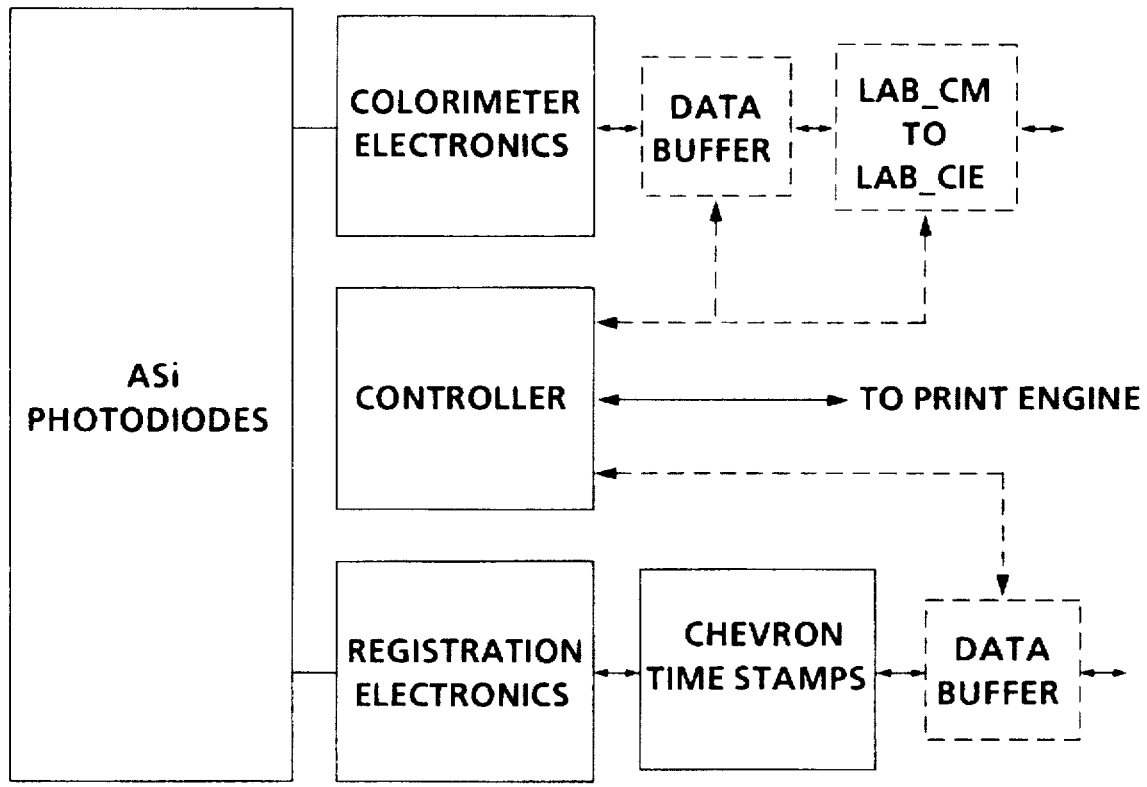
FIG. 7 illustates a block diagram of an example of control circuitry for the sensor.

One of the major contributing factors in the low cost implementation of this sensor in a DOT is the utilization of mixed-signal LSI technology. This allows the conversion of the aSi photodiode outputs into a usable signal level to enable high speed measurements in DOT's with high process speeds. Included on the chip is a precision integration capacitor. This allows conversion of currents of less than 500 femtoamps to be repeatably measured with a signal to noise ratio greater than 80 dB. This excellent performance gives the sensor the capability of measuring color patches with integration times on the order of 1 millisecond or less. FIG. 7 illustates a block diagram of an example of control circuitry for the sensor.

Figure 1:
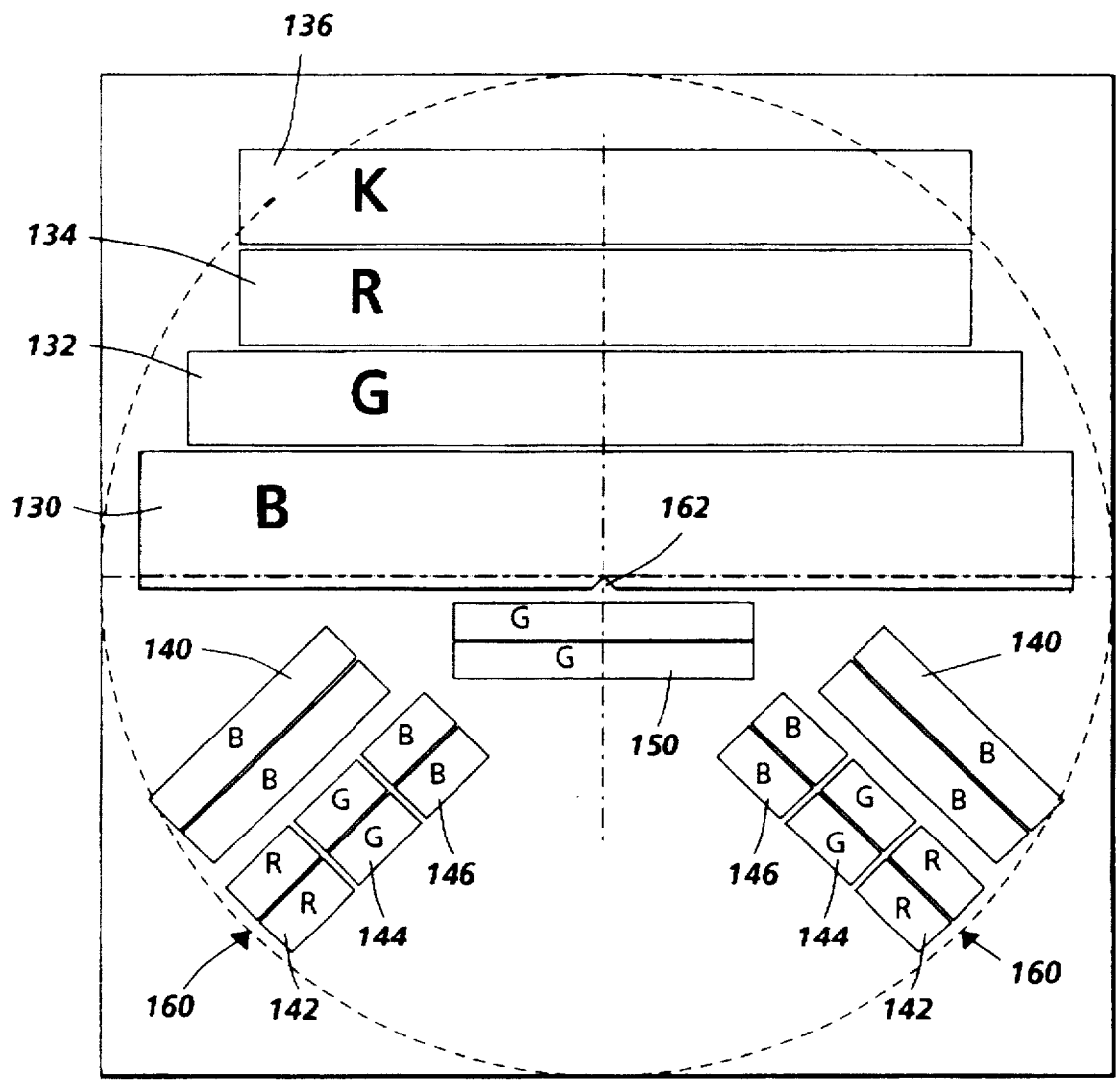
FIG. 1 shows the sensor pattern arrangement for using the present invention.

The operation of the detector 100 for colorimetry and registration measurement is based on imaging the diffuse reflection of the illuminated target 52 onto a detector at 1:1 magnification to take advantage of symmetry in minimizing image defects. The essential geometry of the colorimetry and registration detector chip is shown in the drawing of FIG. 1. It occupies an 8 mm×8 mm area. A description of the functions are as follows:

Colorimetry is performed by the four large rectangular areas near the top of the figure. The pattern lies within the 4 mm radius field of view with the increasing area dedicated to weaker signals (i.e., the blue pattern 130 is the largest at 7.4 mm×1.1 mm, the green pattern 132 is 6.6 mm×0.75 mm, and the red signal 134 is expected to be the strongest and therefore allocated the smallest area of 5.8 mm×0.75 mm).

Even in the absence of light, depending upon the electrical bias, there may be a signal out of the photodiode, which is significantly temperature dependent. This signal is due to the so-called dark reverse current. If this current is measured before each reading is taken, and then subtracted from the total reading, there is no loss of accuracy. However, this repetitive procedure imposes measurement delay and induces life limiting stress on the sensor components by the cycling it implies. The black-filtered photodiode 136 has an output which continuously measures dark reverse current irrespective of whether the lamp is ON or OFF. It must be assumed, of course that the dark reverse current density is the same in the four elements 130,132, 134 and 136. This allows keeping the lamp ON for color measurements only. The output of the black pattern 136 can be used to compensate for drift of temperature dependent parameters through feedback control. Filters such as Brewer Science polyimides are suitable for use such as: Red 101, Green 103, Blue EXP93006 (aka, ExpBlue#4).

Registration detection is performed using segmented bi-cells 140, 142, 144, 146 arranged in a chevron pattern. The blue channel, being the weakest expected signal, has additional surface dedicated to it. Each of the smaller bi-cell halves 142, 144,146 are 0.7 mm×0.4 mm. The larger blue bi-cell halves 140 are 1.9 mm×0.4 mm.

The timing mark and image artifact detector is the horizontal green bicell pattern 150 in the middle of the sensor and measures 2.4 mm×0.29 mm. It is used to facilitate the windowing problem by detecting separation marks placed between the color patches. This approach makes it possible to accurately locate the target patch with reduced resource requirements. Specifically, the colorimetric measurements would be triggered a specific time delay after a timing mark, such as a line across the process direction approximately 0.29 mm thick and more than 2.4 mm wide, is detected. The motivation for following this procedure is that the noise within a half-tone color sample patch places a restriction on its minimal size even if the neasurement system does not. In the interest of measurement efficiency, provision is made to provide sufficient sample sizes in a layout of test samples which does not waste space. When a filtered photodiode is known to be within the moving image of a color sample, the signal from the photodiode is continuously integrated. Accurate starting and stopping of this integration affords maximum signal efficiency and is enabled by accurate "windowing". In practice, a timing mark would be placed between every "N" color samples.

There are two triangular alignment marks 160 at the perimeter of the sensor near the red bi-cells 142. A third mark 162 is a triangular relief in the blue colorimetry pattern 130. This mark also indicates the sensor's optical center. The marks are used during assembly of the chip on the electronics board. The chips will use either standard 24 pin DIPs or chip-on-board technology. With this later technology, the amorphous silicon die is directly mounted and electrically connected to a printed circuit substrate.

Gloss detection is performed by a separate chip. A green filter coating (such as Brewer 103) can be applied to limit the signal to the wavelength distribution characterizing the human eye. The detector has an active rectangular area of 6.4 mm×3.2 mm and is shown in FIGS. 2 and 4 as 107.

Figure 2:
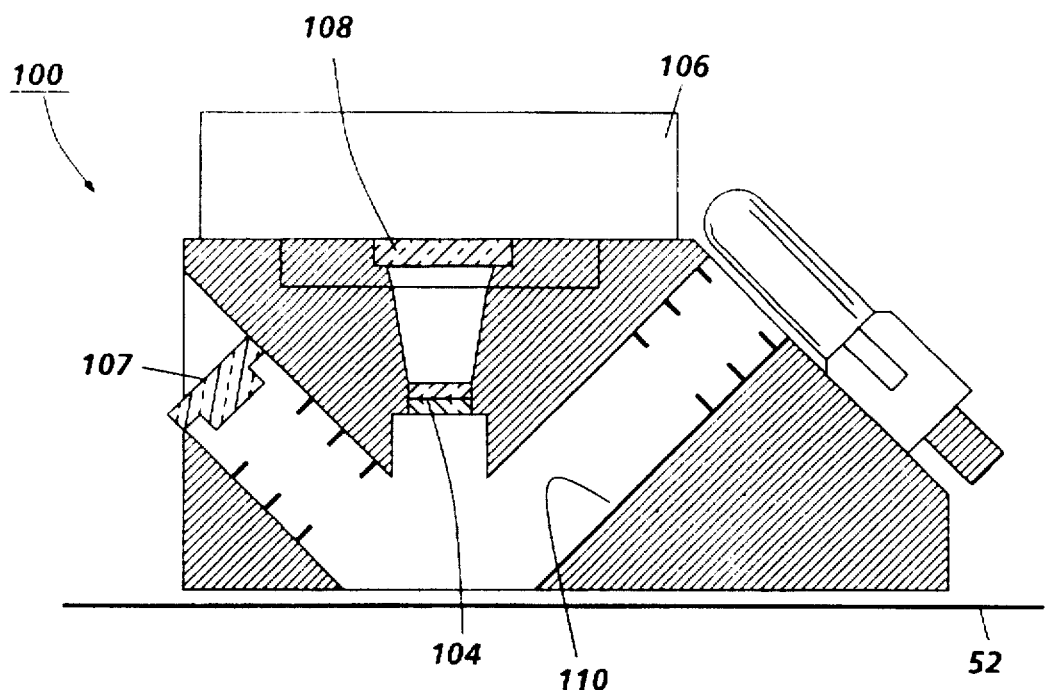
FIG. 2 illustrates a side elevational view of a first embodiment of the combination sensor of the invention herein.
Figure 3:
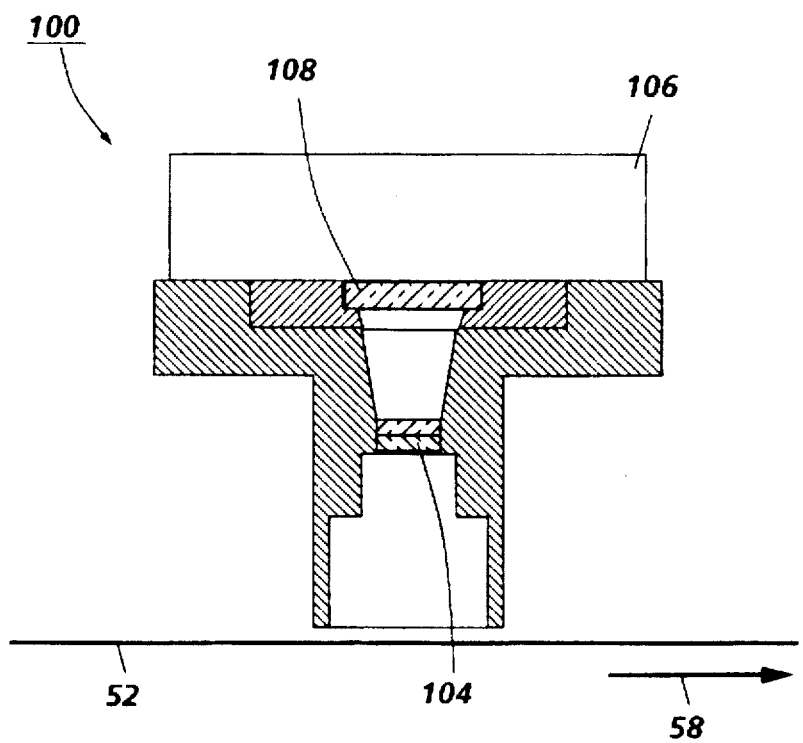
FIG. 3 illustrates an end elevational view of the FIG. 1 sensor.

FIG. 2 illustrates a general arrangement of the sensor with the illumination source 102, the optics 104, the detectors 106 and the trimming filter 108. The illumination is provided by a tungsten-halogen lamp (ie. Sylvania 1990). In one configuration the lamp filament was located two inches from the target and without intervening optics. This resulted in good performance but insufficient light to take a reading in 0.25 inches of travel in a 1000 mm/sec printer of a target patch with an optical density greater than 2.

Figure 4:
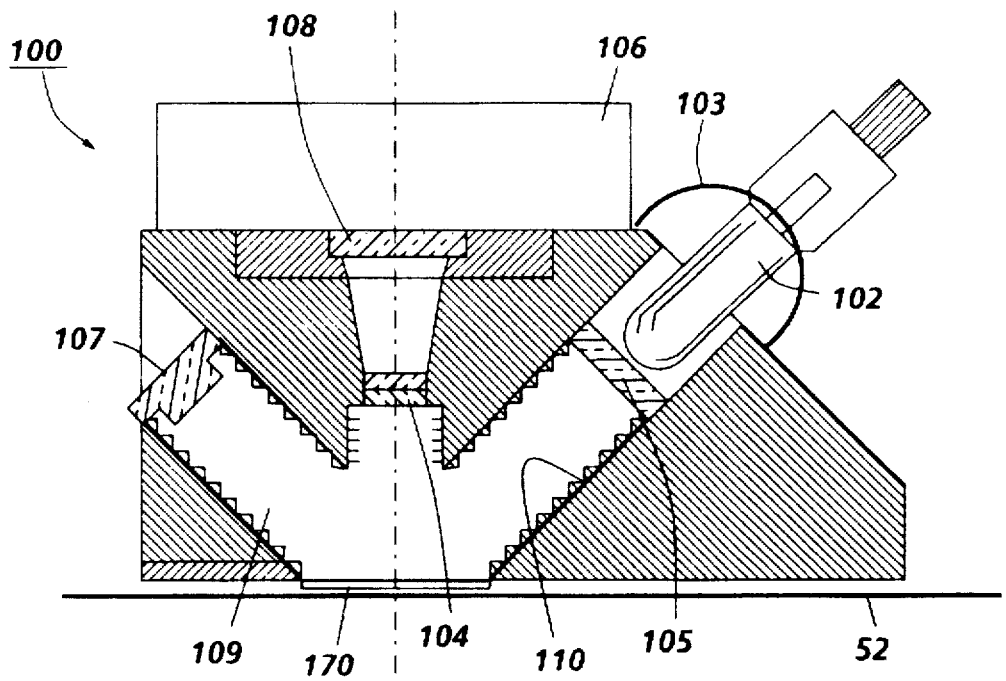
FIG. 4 illustrates a side elevational view of a second embodiment of the combination sensor of the invention herein.
Figure 5:
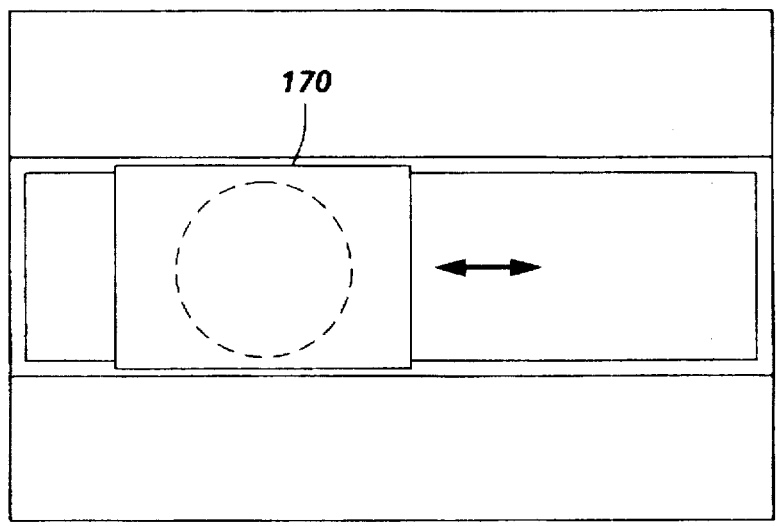
FIG. 5 illustrates a plan view of the FIG. 4 embodiment illustrating the combination calibration shutter dust cover.

In order to increase the lighting, a second embodiment as illustrated in FIG. 4 was developed. The lamp 102 was placed at 1.5 inches from the target, a curved reflector 103 was placed behind it, and a light diffuser 105 was added in the light path 109. With this configuration, the 0.25 inch square measurement patch can be achieved at 1000 mm/sec. This measurement area was selected as a minimum in order to avoid noise due the halftone pattern. However, longer patches are undesirable due to the waste of space.

The lenses used are 6 mm in diameter which can be adjusted in size depending on the application. Two configurations of lenses are suggested: a) two plano-convex lenses assembled belly-to-belly; b) two doublet achromat lenses assembled belly-to-belly. An aperture washer is located between the lenses. The apertures are holes 3 or 4.5 mm in diameter in a 0.5 mm thick black washer. Lenses can be a molded plastic material. All internal light passages are round and have sharp tooth threads 110 to minimize stray light paths. After the lenses the light crosses an infrared filter 108 which acts as a detector trimmer. Its task is to eliminate the narrow region of sensitivity of the amorphous silicon in the infrared region of the spectrum. An example of a suitable filter is an ORIEL 51980 (a BG38 style) filter.

The sensor may also be used for optical density grayscale detection and gloss detection in black and white printers. The optical density can be determined by utilizing the green channel of the sensor to measure the density of the black toner or ink.

In recapitulation, there is provided a method and apparatus for measuring colorimetric, gloss and registration data on a substrate exiting a printing machine. A detector using a series of red, green, and blue filters collects image data and maps the collected data to absolute color coordinates specific to the colorants used in the printing machine. Gloss measurements are made using the same instrument. Registration data between the various color separations is also obtained and feedback delivered to the various imaging modules. The detector allows on the fly data to be obtained and machine specific corrections to be made.

It is, therefore, apparent that there has been provided in accordance with the present invention, a colorimetry, gloss and registration detection device that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A multi-function sensor for measuring registration, gloss and colorimetric values of a test patch image printed on a substrate in a multi-color printing machine, comprising:

a first detector for determining a colorimetric value of the image and generating a signal indicative thereof;

a second detector for determining a gloss value of the image and generating a signal indicative thereof; and a third detector for determining a registration value between a plurality of color separations in the image and generating a signal indicative thereof;

a fourth detector for internal sensor parameter compensation.

2. An apparatus according to claim 1, wherein said first detector comprises:

a red filter;

a blue filter;

a green filter; and a converter to convert a red, green, and blue signal to an absolute colorimetric value.

3. An apparatus according to claim 2, wherein said converter is specifically mapped to the colorants utilized in the printing machine.

4. A method for determining colorimetric, gloss, and registration mark values in a full color electrophotographic printing machine, comprising:

illuminating a test pattern with a light source;

detecting the reflected signal from the test pattern;

filtering the detected signal with a red, green, and blue filter respectively; and converting the filtered signals to colorimetric ($L^*$ $a^*$ $b^*$) values and gloss values for the specific colorant in the printing machine while measuring the position of the relative color separations and generating signals indicative thereof.

5. A full color electrophotographic printing machine having an integral device for determining colorimetric, gloss, and registration values for a test patch image, comprising:

a first detector for determining a colorimetric value of the image and generating a signal indicative thereof;

a second detector for determining a gloss value of the image and generating a signal indicative thereof; and a third detector for determining a registration value between a plurality of color separations in the image and generating a signal indicative thereof.

6. A printing machine according to claim 5, wherein said first detector comprises:

a red filter;

a blue filter;

a green filter; and a converter to convert a red, green, and blue signal to a colorimetric value.

7. A printing machine according to claim 6, wherein a converter is specifically created for the colorants utilized in the printing machine.

8. A multi-function sensor for measuring registration, gloss and colorimetric values of a test patch image printed on a substrate in a multi-color electrophotographic printing machine, comprising:

a first detector for determining a colorimetric value of the image and generating a signal indicative thereof;

a second detector for determining a gloss value of the image and generating a signal indicative thereof; and a third detector for determining a registration value between a plurality of color separations in the image and generating a signal indicative thereof;

a fourth detector for internal sensor parameter compensation.

9. A sensor according to claim 8, wherein said first detector comprises:

a red filter;

a blue filter;

a green filter; and a converter to convert a red, green, and blue signal to an absolute colorimetric value.

10. A sensor according to claim 9, wherein said converter is specifically mapped to the colorants utilized in the printing machine.

11. A multi-function sensor for measuring gloss and optical density values of a test image printed on a substrate in a black and white printing machine, comprising:

- a first detector for determining a density value of the image and generating a signal indicative thereof; and
- a second detector for determining a gloss value of the image and generating a signal indicative thereof.

12. A sensor according to claim 11, wherein said first detector comprises:

a green filter; and a converter to convert a green signal to an absolute density value.

13. An integral apparatus for measuring registration, gloss and colorimetric values of a test patch image printed on a substrate, comprising:

- a first detector for determining a colorimetric value of the image and generating a signal indicative thereof;
- a second detector for determining a gloss value of the image and generating a signal indicative thereof; and
- a third detector for determining a registration value between a plurality of color separations in the image and generating a signal indicative thereof.

* * * * *